United States Patent Office 3,554,913
Patented Jan. 12, 1971

3,554,913
FRICTION REDUCTION BY COPOLYMER OF n-ALKYL METHACRYLATES AND METH-ACRYLIC ACID IN SOLUTION
Henry Gisser and Marco Petronio, Philadelphia, Pa., assignors to the United States of America as represented by the Secretary of the Army
No Drawing. Continuation-in-part of application Ser. No. 642,673, May 25, 1967. This application Aug. 15, 1969, Ser. No. 850,622
Int. Cl. C10m 1/26
U.S. Cl. 252—56
1 Claim

ABSTRACT OF THE DISCLOSURE

A copolymer of n-alkyl methacrylates and methacrylic acid wherein the alkyl group may vary from 14 to 22 carbon atoms, which when applied in solution, reduces the friction of solid surfaces.

---

This application is a continuation-in-part of patent application, Ser. No. 642,673 by Henry Gisser and Marco Petronio, for "Friction Reduction by Copolymer of n-Alkyl Methacrylates and Methacrylic Acid in Solution," filed May 25, 1967, now abandoned, and assigned to the same assignee hereof.

The invention described herein may be manufactured, used and licensed by or for the Government for governmental purposes without the payment to us of any royalty thereon.

This invention relates to lubricants, and more particularly relates to methacrylate polymers for reducing the friction properties of sliding surfaces when subjected to the lubricants.

The use of polymers as oil additives has been practiced for many years, but only recently has attention been given to the relationship of the relationship of the polymer to the lubrication process. Early observations indicated that polymer-containing motor oils reduced engine friction, i.e., lower engine friction was obtained with polymer-containing oils than non-polymer containing oils of the same viscosity. This was attributed to the reduction of viscosity of polymer-containing fluids at high shear rates which prevails during engine operation. The temporary reduction of viscosity of polymer solutions under high shear is well known. These early observations on reduced engine friction with polymer-containing oils were confirmed when it was determined that the polymer-containing oils also had a minimum point on the friction-viscosity curve. The polymer-containing oils also yielded less engine wear at viscosities below those corresponding to minimum friction, and above these viscosities wear remained low. These observations are consistent with the classical lubrication picture in which the minimum corresponded to transition between mixed boundary and fluid film lubrication. In several instances, polymers have also been employed as dispersants in lubricating oils.

Therefore, up to the time of the present invention, the action of polymers in friction reduction compositions had been limited to that of oil additives primarily for increasing solubility or enabling the use of lower viscosity fluids. It has been discovered, however, through a study of the friction behavior of polymer solutions in the boundary region in which surface phenomena have been isolated from volume phenomena, that polymer molecules themselves are capable of enhancing the friction properties on a solid surface. The friction behavior of polymeric and copolymeric compound solutions in the boundary region is dependent upon the interactions of the polymer with the solid surface and hence, as would be expected, is a function of the chemical structure of the polymer molecule and its conformation on the surface. This invention therefore is indicative of the strong influence of the chemical structure of polymers on friction and wear behavior.

In the past, considerable work has been done on the friction behavior of low molecular weight organic compounds in solution and in the dry state on solid surfaces. Little work has been done with polymer solutions. The low molecular weight organic compounds although instantaneously successful in increasing the friction reduction properties of surfaces have proved unsuccessful in retaining this beneficial effect for any significant period of time. This failure of an essential lubrication property is due to the inherently poor wear resistant film formed on the surface.

It is an object of this invention to provide new friction reducing compositions.

Another object of this invention is to provide polymeric friction reducing compositions.

A further object of our invention is to provide friction reducing compositions having good wear resistant properties.

In accordance with the present invention, superior friction reducing compositions have been discovered which consist of the copolymers of n-alkyl methacrylates with methacrylic acid wherein the alkyl group may vary from 14 to 22 carbon atoms. A copolymer of this type enables variation of the long chain alkyl group, its concentration, and the concentration of the polar groups. Our preferred copolymers consist of n-hexadecyl methacrylate and methacrylic acid and n-docosyl methacrylate and methacrylic acid.

The copolymers were prepared by heating the monomer mixture in 10% solution in benzene with 1% benzoyl peroxide in sealed glass tubes at 80° C. for 16 hours in a nitrogen atmosphere. The copolymers were precipitated from the benzene solution by adding ethanol and then recrystallized from benzene by precipitation with ethanol.

Coefficient of friction was determined on a modified Bowden-Leben machine in which the tangential force was detected by strain gages mounted on a strain ring, the signals being amplified and recorded. All friction measurements were made with a ¼ in. diameter 440C stainless steel ball rider on an approximately 6 mm. thick plane substrate. Steel, copper, and glass substrates were employed for the measurements. The steel substrate was 1020 steel plate prepared by rinsing in boiling benzene, polishing successively with 400, 600, 2/0, 3/0, and 4/0 silicon carbide paper and rinsing in boiling benzene. It was then placed in a desiccator over anhydrous calcium sulphate for 24 hours before use. The copper substrate (99.98% Cu) was prepared in the same manner as the steel. The glass specimens were cut from 6 mm. thick polished plate, silvering quality soda lime glass, abraded under water successively with 400 and 600 solicon carbide paper followed by rinsing with hot distilled water. These specimens also were stored over anhydrous calcium sulphate for 24 hours before use. All measurements were made at a 100 gram load and 0.04 cm./sec. sliding speed. The length of traverse was 1.3 to 1.9 cm. for each measurement. Three drops of polymer solution were placed in a continuous line along the path to be traversed by the rider, the first drop being placed at a location so that it wet the rider. The area covered by the fluid was approximately 0.9 square centimeter. Friction measurements were started 5 to 10 seconds after applying the copolymer solutions. The standard deviation of the coefficient of friction measurement was 0.005.

The carboxyl groups varied as a function of the mole percent methacrylic acid. Accordingly, polymers of n- hexadecyl methacrylate were prepared by copolymerizing with 20, 40, 60, and 90 mole percent of methacrylic acid. In the case of n-docosyl methacrylate, polymers were prepared by copolymerizing with 30, 50 and 90 mole percent of methacrylic acid. The results of the friction tests for n-hexadecyl methacrylate and methacrylic acid are given in Table I. Results for the n-docosyl methacrylate polymer are presented in Table II. In both cases, a concentration of 1.0 mg. copolymer per ml. of xylene was used, however, benzene or various petroleum hydrocarbon fluids could also be employed. As shown by the data a substrate coated with copolymer consisting of about 50 to 60 mole percent methacrylic acid will have a minimum coefficient of friction. Since there is an increase in the coefficient of friction when either the methacrylic acid or the straight chain alkyl groups are increased, it is evident that both the polar carboxyl groups and the alkyl chain cooperate in decreasing friction on a surface.

It should be noted that the concentration of the polymer in xylene, benzene, or other solvents may vary from 0.01 to 10.0 mg./ml. without any significant effect on the coefficient of friction.

TABLE I
[Coefficient of friction ($\mu$) of methacrylic acid-n-hexadecyl methacrylate copolymer with stainless steel rider]

| Mole fraction | $\mu$ on steel | $\mu$ on copper |
|---|---|---|
| 0.0 | 0.210 | 0.262 |
| 0.2 | 0.198 | 0.251 |
| 0.4 | 0.168 | 0.238 |
| 0.6 | 0.157 | 0.238 |
| 0.9 | 0.221 | 0.280 |

TABLE II

Coefficient of friction ($\mu$) of methacrylic acid-n-docosyl methacrylate copolymer with stainless steel rider.

| Mole fraction: | $\mu$ on steel |
|---|---|
| 0.0 | 0.210 |
| 0.3 | 0.185 |
| 0.5 | 0.162 |
| 0.9 | 0.176 |

The molecular weights of the n-hexadecyl methacrylate copolymers are given in Table III.

TABLE III
[Molecular weights of n-hexadecyl methacrylate-methacrylic acid copolymers]

| Mole fraction methacrylic acid | Molecular weight[a] $- \times 10^{-5}$ | Relative polymer chain length[b] |
|---|---|---|
| 0 | 0.50 | 0.021 |
| 0.2 | 0.50 | 0.024 |
| 0.4 | 1.0 | 0.059 |
| 0.6 | 1.5 | 0.11 |

[a] Determined by membrane osmometry.
[b] Relative to poly(methyl methacrylate)

We wish it to be understood that we do not desire to be limited to the exact details described, for obvious modifications will occur to a person skilled in the art.

We claim:

1. A polymeric friction reducing composition consisting essentially of 0.1–10 mg. of a copolymer of n-alkyl methacrylate and methacrylic acid per ml. of a solvent wherein the alkyl group of said methacrylate has 22 carbon atoms, said copolymer consisting of n-docosyl methacrylate and methacrylic acid in a proportion of .9 mole fraction of said acid to said methacrylate.

References Cited

UNITED STATES PATENTS

| 2,607,711 | 8/1952 | Hendricks | 260—86.1X |
| 2,917,375 | 12/1959 | Hudson | 44—62 |
| 3,287,264 | 11/1966 | Topper | 252—56X |

DANIEL E. WYMAN, Primary Examiner
W. H. CANNON, Assistant Examiner

U.S. Cl. X.R.
252—12